US 011719359B2

US 11,719,359 B2
Aug. 8, 2023

(12) United States Patent
Solfelt et al.

(10) Patent No.: US 11,719,359 B2
(45) Date of Patent: Aug. 8, 2023

(54) DIAPHRAGM PUMP LEAK DETECTION (71) Applicant: PSG CALIFORNIA LLC, Grand Terrace, CA (US)

(72) Inventors: Erik Nathaniel Solfelt, Riverside, CA (US); Mehrab Mumin Choudhury, West Covina, CA (US); Brian Richard Binder, Grand Rapids, MI (US); Leonard Galvan, Riverside, CA (US); Christopher H. Verdugo, Yorba Linda, CA (US); Christopher Jon Distaso, Upland, CA (US); Samuel Vanderpoel Gilbert, V, Riverside, CA (US)

(73) Assignee: PSG CALIFORNIA LLC, Grand Terrace, CA (US)

( * ) Notice: Subject to any disclaimer, the term of this patent is extended or adjusted under 35 U.S.C. 154(b) by 0 days.

(21) Appl. No.: 17/450,218

(22) Filed: Oct. 7, 2021

(65) Prior Publication Data

US 2022/0025878 A1  Jan. 27, 2022

Related U.S. Application Data (63) Continuation of application No. 16/731,287, filed on Dec. 31, 2019, now Pat. No. 11,149,723.

(51) Int. Cl.
*F16K 37/00* (2006.01)
*F04B 43/00* (2006.01)
*F04B 43/02* (2006.01)

(52) U.S. Cl.
CPC ........ *F16K 37/0083* (2013.01); *F04B 43/009* (2013.01); *F04B 43/02* (2013.01);
(Continued)

(58) Field of Classification Search
CPC ......... Y10T 137/3084–3105; Y10T 137/5762; Y10T 137/5907; Y10T 137/83042;
(Continued)

(56) References Cited

U.S. PATENT DOCUMENTS 2,563,211 A * 8/1951 Cassese ................. C02F 1/686
138/40
3,152,572 A * 10/1964 Allhoff, Jr. ......... G01M 3/2807
116/228
(Continued)

FOREIGN PATENT DOCUMENTS

CN   201437770   ‡ 4/2010
CN   103147971   ‡ 6/2013
(Continued)

OTHER PUBLICATIONS

PCT International Search Report and Written Opinion in International Appln. No. PCT/US2020/067290, dated Mar. 8, 2021, 8 pages.‡

(Continued)

*Primary Examiner* — William M McCalister
(74) *Attorney, Agent, or Firm* — Fish & Richardson P.C.

(57) ABSTRACT

In one general aspect, the present application relates to a leak detection device that includes a body, a liquid separator, and a liquid level detector. The body includes an airflow inlet, an airflow outlet, and a liquid reservoir. The airflow outlet is arranged to substantially align with the airflow inlet. The liquid reservoir is formed in a bottom portion of the body. The liquid separator is positioned directly between the airflow inlet and the airflow outlet. The liquid separator divides an airflow path from the airflow inlet to the airflow outlet into at least two separate flow paths around the liquid separator. The liquid level detector is at least partially contained within a channel defined within a lower portion of (Continued)

the liquid separator, where the channel is in liquid communication with the liquid reservoir.

15 Claims, 4 Drawing Sheets

(52) U.S. Cl.
CPC .. *F16K 37/0091* (2013.01); *F04B 2201/0803* (2013.01); *Y10T 137/3084* (2015.04); *Y10T 137/5907* (2015.04); *Y10T 137/8342* (2015.04)

(58) Field of Classification Search
CPC .. Y10T 137/8342; F04B 43/02; F04B 43/009; F04B 2201/0803; F16K 37/0083; F16K 37/0091
USPC .......................... 137/197–204, 312, 314, 558
See application file for complete search history.

(56) References Cited

U.S. PATENT DOCUMENTS

| | | | | |
|---|---|---|---|---|
| 3,982,538 A * | 9/1976 | Sharpe | A61M 1/882 | 73/864.03 |
| 3,982,609 A * | 9/1976 | Bouplon | F16N 7/34 | 184/39.1 |
| 4,860,788 A * | 8/1989 | Asaoka | F15B 13/015 | 251/63 |
| 4,953,583 A * | 9/1990 | Szlaga | F16K 31/365 | 220/203.23 |
| 5,096,087 A * | 3/1992 | Thomas | B65D 90/501 | 220/627 |
| 5,097,746 A * | 3/1992 | Asaoka | G05D 16/187 | 91/452 |
| 5,469,879 A * | 11/1995 | Rasmussen | F16T 1/00 | 137/392 |
| 5,501,577 A ‡ | 3/1996 | Cornell | F04B 43/009 | 417/313 |
| 5,816,778 A * | 10/1998 | Elsey, Jr | F04B 43/0736 | 417/393 |
| 5,877,689 A * | 3/1999 | D'Amico | F24H 9/2007 | 73/317 |
| 6,026,842 A * | 2/2000 | Gallant | F16K 24/044 | 137/197 |
| 6,280,149 B1 * | 8/2001 | Able | F04B 43/0736 | 417/63 |
| 6,626,900 B1 * | 9/2003 | Sinofsky | A61B 18/245 | 606/7 |
| 7,198,060 B2 * | 4/2007 | Hiser | F16K 27/003 | 137/509 |
| 7,302,964 B1 * | 12/2007 | Perry | F16K 24/04 | 137/558 |
| 7,543,601 B2 * | 6/2009 | Delaire | F16K 17/196 | 123/520 |
| 7,565,915 B2 * | 7/2009 | Krug-Kussius | F16H 61/4139 | 137/492.5 |
| 8,100,153 B2 * | 1/2012 | Hirata | F16K 31/22 | 141/95 |
| 8,256,455 B1 * | 9/2012 | Ball | F16K 31/56 | 137/551 |
| 8,360,096 B2 * | 1/2013 | Courtright | F16K 15/044 | 137/488 |
| 8,926,291 B2 ‡ | 1/2015 | Orndorff | F04B 49/065 | 417/46 |
| 9,028,224 B2 | 5/2015 | Headley et al. | | |
| 9,377,125 B2 * | 6/2016 | Lee | F16K 31/18 | |
| 10,437,269 B1 * | 10/2019 | Zähe | F15B 13/029 | |
| 10,683,879 B1 * | 6/2020 | Zähe | F15B 13/0442 | |
| 10,775,812 B1 * | 9/2020 | Zähe | F16K 17/044 | |
| 2003/0015840 A1 * | 1/2003 | Davis | G01M 3/2869 | 277/320 |
| 2005/0183775 A1 * | 8/2005 | Cheong | F15B 13/024 | 137/491 |
| 2006/0000508 A1 * | 1/2006 | Delaire | F16K 13/10 | 137/247.35 |
| 2006/0266419 A1 * | 11/2006 | Krug-Kussius | F16H 61/4139 | 137/491 |
| 2007/0151605 A1 * | 7/2007 | O'Hara | F17D 5/02 | 137/409 |
| 2007/0209705 A1 * | 9/2007 | Nichols | B60T 17/043 | 137/204 |
| 2008/0010956 A1 * | 1/2008 | Fogelman | B01D 19/0052 | 55/319 |
| 2008/0068189 A1 * | 3/2008 | Murphy | G08B 21/20 | 340/605 |
| 2008/0135105 A1 * | 6/2008 | Lacza | B29C 45/82 | 264/299 |
| 2011/0126917 A1 * | 6/2011 | Nakata | F24F 1/0063 | 137/268 |
| 2011/0162727 A1 * | 7/2011 | Stieb | F17D 5/06 | 137/487.5 |
| 2013/0037129 A1 * | 2/2013 | Murphy | G01M 3/3209 | 137/393 |
| 2013/0042919 A1 * | 2/2013 | Lambke | G01F 23/292 | 137/558 |
| 2014/0150891 A1 * | 6/2014 | Schlensker | F16T 1/00 | 137/197 |
| 2014/0348667 A1 * | 11/2014 | McCourt | F04B 43/0736 | 417/46 |
| 2016/0061342 A1 * | 3/2016 | Vu | F16K 24/044 | 137/202 |
| 2016/0146399 A1 * | 5/2016 | Katsura | F16T 1/34 | 137/197 |
| 2019/0265094 A1 * | 8/2019 | Fisher | G01F 25/17 | |
| 2019/0316592 A1 ‡ | 10/2019 | Jenkins | G01H 1/003 | |
| 2020/0277950 A1 * | 9/2020 | Rhyner | F04B 51/00 | |
| 2021/0199103 A1 | 7/2021 | Solfet et al. | | |

FOREIGN PATENT DOCUMENTS

| | | | |
|---|---|---|---|
| CN | 203146296 | ‡ | 8/2013 |
| WO | WO 2020/146778 | ‡ | 7/2020 |

OTHER PUBLICATIONS

International Preliminary Report on Patentability in International Appln. No. PCT/US2020/067290, dated Jul. 14, 2022, 7 pages.
Extended European Search Report in European Appln. No. 201910896.8, dated Apr. 3, 2023, 9 pages.

\* cited by examiner
‡ imported from a related application

DIAPHRAGM PUMP LEAK DETECTION

CROSS-REFERENCE TO RELATED APPLICATION

This application is a continuation of U.S. patent application Ser. No. 16/731,287, filed Dec. 31, 2019, the disclosure of which is incorporated herein by reference in its entirety.

TECHNICAL FIELD

This invention relates to pump leak detection.

BACKGROUND

Air-operated diaphragm pumps are used for liquid transfer in many different industries. For instance, air-operated diaphragm pumps are used for liquid transfer where purity of the transfer liquid, high flow rates, and/or reliable and predictable flow volumes are needed. Air-operated diaphragm pumps are also used to transfer hazardous chemicals. For example, air-operated diaphragm pumps are commonly used in industries such as the food and beverage industry, chemical processing, oil and gas, and the semiconductor industry.

Diaphragm ruptures or leaks diminish the performance of the pump, and may introduce impurities into the transfer liquid, or may expose personnel to a hazardous transfer liquid. Leak detection devices can be used to detect diaphragm leaks. However, existing leak detection devices often rely on restrictive airflow paths to remove entrained liquid from pump exhaust air and detect a leak. Such restrictive airflow paths can reduce the operating efficiency and effectiveness of an air-operated pump by, for example, creating a backpressure on the pump's exhaust. The back pressure reduces the differential pressure available across a pump's diaphragm thus reducing the pump's output pressure and/or pumping rate. Accordingly, improvements are continually sought for diaphragm leak detection.

SUMMARY

Implementations of the present disclosure are generally directed to a leak detection device. More specifically, implementations are directed to a diaphragm leak detection device for air-operated pumps and a pump system incorporating the leak detection device. Implementations of the leak detection device described herein employ a minimally restrictive path from the air exhaust of the air-operated pump, through the leak detection device, and into a pump muffler. Implementations of the leak detection device provide an air impingement surface directly in the flow path of the exhaust air from the pump. The air impingement surface causes heavy liquid particles entrained in the air (e.g., from a diaphragm leak) to fall out of the air flow when they impact the surface and it diverts the air around the surface. The liquid is collected in a liquid reservoir and a liquid level detector is used to alert personnel to the diaphragm leak.

One general aspect can be embodied in a leak detection device that includes a body, a liquid separator, and a liquid level detector. The body includes an airflow inlet, an airflow outlet, and a liquid reservoir. The airflow outlet is arranged to substantially align with the airflow inlet. The liquid reservoir is formed in a bottom portion of the body. The liquid separator is positioned directly between the airflow inlet and the airflow outlet. The liquid separator divides an airflow path from the airflow inlet to the airflow outlet into at least two separate flow paths around the liquid separator. The liquid level detector is at least partially contained within a channel defined within a lower portion of the liquid separator, where the channel is in liquid communication with the liquid reservoir. This and other implementations can each optionally include one or more of the following features.

In some implementations, the liquid level detector includes a float switch assembly.

In some implementations, the float switch assembly includes a float operably coupled with a float sensor. The float is housed within the channel in the lower portion of the liquid separator.

In some implementations, the float sensor extends, at least partially, into the channel defined within the lower portion of the liquid separator.

In some implementations, the body includes an upper housing including the airflow inlet and the airflow outlet. A lower housing defines the liquid reservoir.

In some implementations, the liquid separator includes a cylinder coupled to the body and positioned directly between the airflow inlet and the airflow outlet and a sleeve configured to interface with a lower portion of the cylinder. The sleeve includes the channel, where a first end of the channel terminates at the lower portion of the cylinder and a second end of the channel opens to the liquid reservoir.

In some implementations, the liquid level detector is coupled to the lower portion of the cylinder and extends into the channel.

In some implementations, the body includes a shelf positioned above the liquid reservoir. The sleeve includes a tapered flange in contact with the shelf, the tapered flange separating the liquid reservoir from an airflow path in an upper portion of the body.

In some implementations, the shelf includes at least one drain channel that provides liquid communication between the liquid reservoir and the airflow path. In some implementations, the body includes an upper housing and a lower housing, separable from the upper housing. The upper housing includes the airflow inlet, the airflow outlet, and the airflow path between the airflow inlet and the airflow outlet. The lower housing, separable from the upper housing, includes the liquid reservoir, the shelf, and at least one drain channel.

A second general aspect can be embodied in a diaphragm pump system including an air-operated diaphragm pump, a diaphragm leak detection device, and a muffler. The air-operated diaphragm pump includes an air valve assembly with an exhaust outlet. The diaphragm leak detection device includes a body having an airflow inlet and an outlet, with the airflow inlet coupled to the exhaust outlet. The diaphragm leak detection device includes a liquid separator and a liquid level detector. The liquid separator is arranged within the body to direct airflow from the exhaust outlet along at least two flow paths around the liquid separator towards the muffler inlet. The liquid level detector at least partially contained within a channel defined within a lower portion of the liquid separator, where the channel is in liquid communication with a liquid reservoir in a bottom portion of the body.

The muffler includes a muffler inlet coupled to an airflow outlet of the diaphragm leak detection device where the muffler inlet is substantially aligned with the exhaust outlet through the body of the diaphragm leak detection device.

In these and other implementations, a surface of the liquid separator forms a direct impingement surface and the body of the diaphragm leak detection device is configured to direct airflow from the exhaust outlet against the direct impingement surface.

In these and other implementations, the body of the diaphragm leak detection device includes an upper housing and a lower housing. The upper housing includes the airflow inlet and the airflow outlet. The lower housing defines the liquid reservoir.

In these and other implementations, the liquid separator includes a cylinder and a sleeve. The cylinder is coupled to the body and positioned directly between the airflow inlet and the airflow outlet. The sleeve is configured to interface with a lower portion of the cylinder. The sleeve includes the channel, where a first end of the channel terminates at the lower portion of the cylinder and a second end of the channel opens to the liquid reservoir.

In these and other implementations, the liquid level detector is coupled to the lower portion of the cylinder and extends into the channel.

In these and other implementations, the body of the diaphragm leak detection device includes a shelf positioned above the liquid reservoir. The sleeve includes a tapered flange in contact with the shelf. The tapered flange separates the liquid reservoir from an airflow path in an upper portion of the body.

In these and other implementations, the shelf includes at least one drain channel that provides liquid communication between the liquid reservoir and the airflow path.

In these and other implementations, the liquid level detector comprises a float switch assembly.

In these and other implementations, the body of the diaphragm leak detection device includes an upper housing and a lower housing. The upper housing includes the airflow inlet and the airflow outlet. The lower housing is separable from the upper housing. The lower housing includes the liquid reservoir, the shelf, and at least one drain channel.

A third general aspect can be embodied in a method for diaphragm pump leak detection. The method includes receiving, by a leak detection device, exhaust air from an air-operated diaphragm pump. The method includes removing liquid entrained in the exhaust air by using a direct impingement device to direct a flow of the exhaust air into at least two separate flow paths around the direct impingement device, where impingement of the exhaust air on the direct impingement device removes the liquid from the exhaust air. The method includes directing the liquid into a liquid reservoir positioned below the direct impingement device. The method includes providing a leak indication signal responsive to activation of a float switch that is at least partially contained within a channel defined by a lower portion of the direct impingement device and the channel being in liquid communication with the reservoir.

The concepts described herein may provide several advantages. For example, implementations of the invention provide an air-operated pump leak detection device that imposes minimal flow restriction exhaust air. Implementations may provide leak detection capabilities with little or no increase in backpressure on air-operated pump exhaust.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
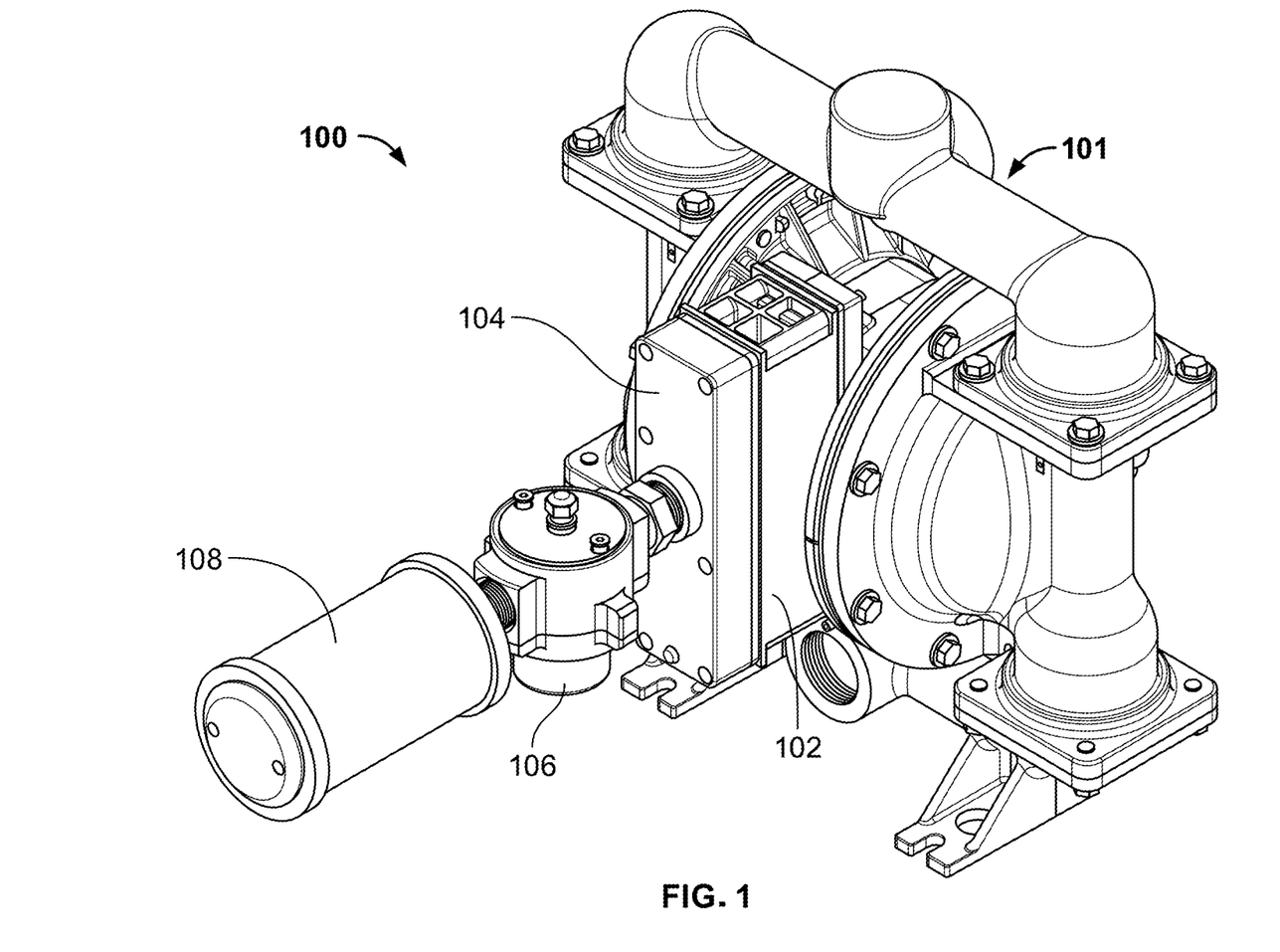
FIG. 1 depicts a perspective view of an air-operated diaphragm pump system according to implementations of the present disclosure.
Figure 2:
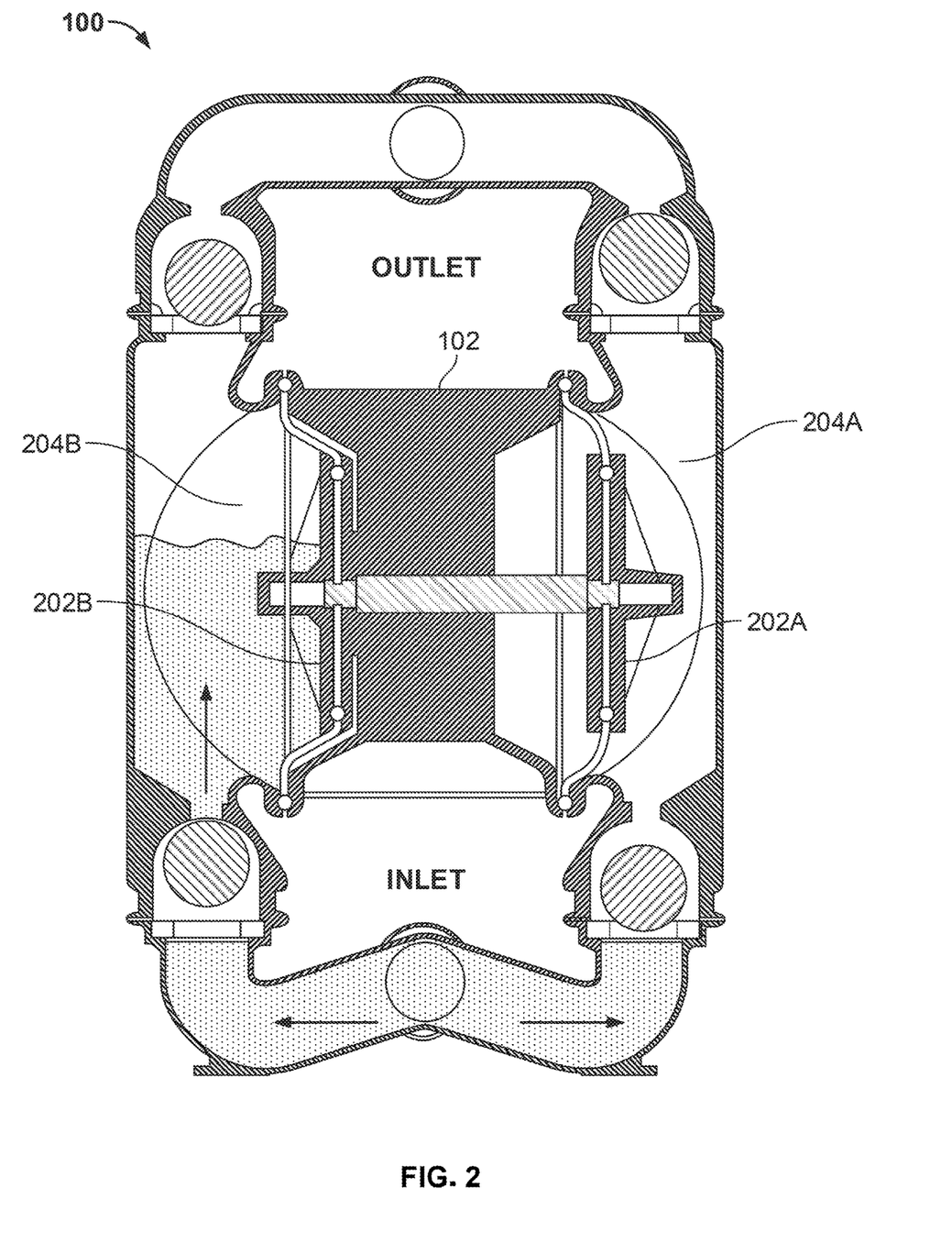
FIG. 2 depicts a functional diagram of an exemplary air-operated diaphragm pump.

FIG. 1 depicts a perspective view of an air-operated diaphragm pumping system 100. The system includes diaphragm pump 101, the pump's air-valve assembly 102, a muffler plate 104, a leak detection device 106, and a muffler 108. FIG. 2 depicts a functional diagram of an exemplary air-operated diaphragm pump 101. In general, pump 101 operates by alternately applying high pressure air to one of two diaphragms 202A and 202B during a liquid discharge stroke and exhausting the air to atmosphere during a liquid suction stroke. In more detail, air valves in the air-valve assembly 102 direct pressurized air to the back side of diaphragm 202A. The diaphragms 202A and 202B act as separation membranes between the compressed air and the liquid. The compressed air moves diaphragm 202A away from the center of the pump 101. Diaphragm 202B is pulled in by the shaft connected between the diaphragms 202A and 202B. As diaphragm 202B is on its suction stroke; air behind the diaphragm 202B is forced out to atmosphere through the exhaust outlet of the pump 101 (e.g., through the muffler plate 104). The movement of diaphragm 202B toward the center of the pump 100 creates a vacuum within chamber 204B. Atmospheric pressure forces liquid through the inlet manifold and into chamber 204B.

When the pressurized diaphragm, e.g., diaphragm 202A, reaches the limit of its discharge stroke, the air-valve assembly 102 redirects pressurized air to the back side of diaphragm 202B. The pressurized air forces diaphragm 202B away from the center of pump 101 while pulling diaphragm 202A towards the center of the pump. Diaphragm 202B is now on its discharge stroke. Diaphragm 202B provides hydraulic forces against the liquid in chamber 204B forcing a discharge valve ball off its seat and the liquid through the pump outlet.

Because diaphragms 202A and 202B form separation membranes between the compressed air and the liquid, a diaphragm leak or rupture can introduce air and impurities into the liquid and cause the liquid to be discharged out of the pump's air exhaust. This can contaminate the liquid and present hazards to personnel. For example, leak or rupture in one of the diaphragms 202A or 202B can cause air, and possibly impurities from the air, to be introduced into the liquid during the high-pressure discharge, stroke potentially contaminating the liquid. Moreover, a leak or rupture in one of the diaphragms 202A or 202B can draw the liquid into the air-valve assembly 102 during the low-pressure suction stroke. The liquid may then become entrained in the flow of exhaust air and spray or leak out of the pump 101 through the muffler 108.

Referring again to FIG. 1, in the air-operated pumping system 100, muffler plate 104 is attached to the air valve assembly 102. Muffler plate 104 provides a connection interface to the exhaust of the air valve assembly 102. In some implementations, muffler plate 104 is integrated into air valve assembly 102. Leak detection device 106 is coupled to the muffler plate 104. Leak detection device 106 can be directly coupled to muffler plate 104 or coupled through a fitting piece 110. Muffler 108 is connected to an outlet of leak detection device 106. However, in alternate implementations leak detection device 106 can be connected directly to the air valve assembly 102. For example, the air valve assembly 102 can have a connection interface on the exhaust outlet.

In some implementations, as illustrated in FIG. 1, the system 100 is configured such that the air valve assembly's 102 exhaust outlet is substantially aligned with the inlet to the muffler 108 through leak detection device 106. In other words, an air flow path from the air valve assembly exhaust through leak detection device 106 and into muffler 108 is a substantially straight flow path.

Figure 3:
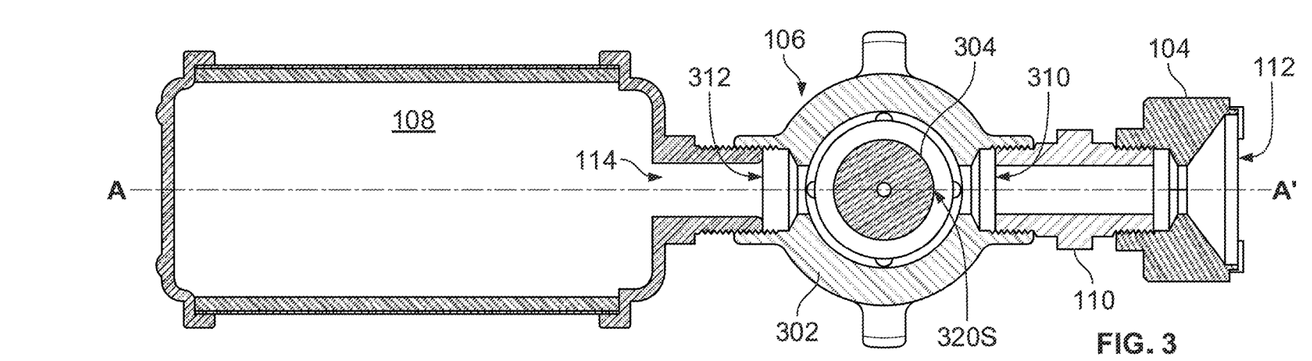
FIG. 3 depicts a top cross-sectional view of the leak detection device of FIG. 1 taken at axis A-A'.
Figure 4:
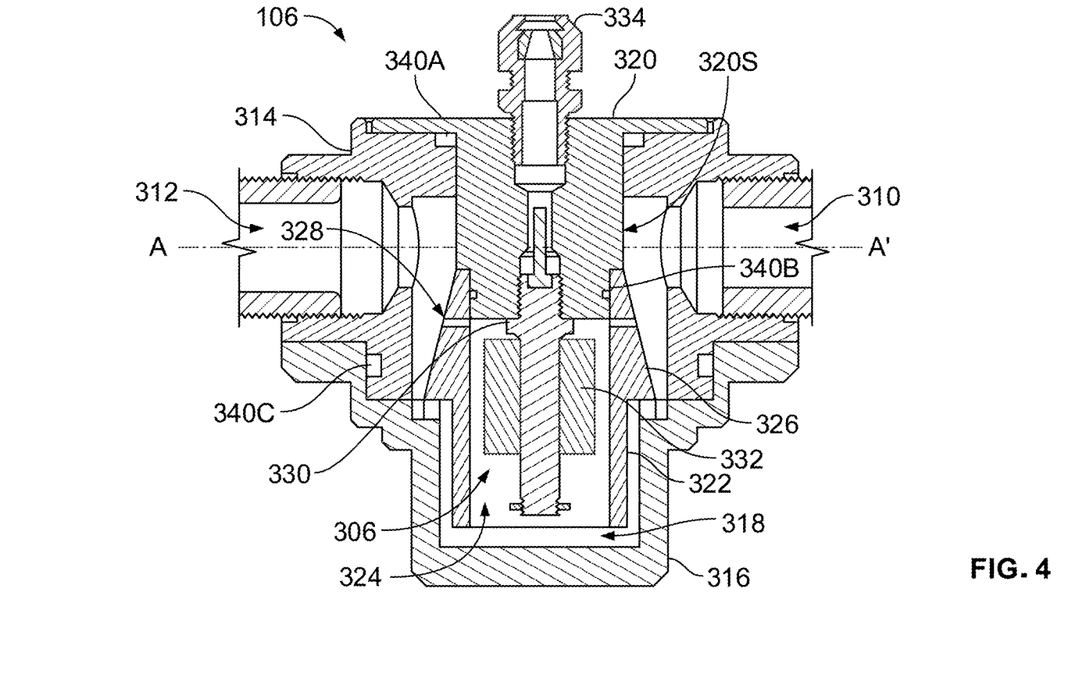
FIG. 4 depicts a side cross-sectional view of the leak detection device of FIG. 1 taken at axis A-A'.
Figure 5:
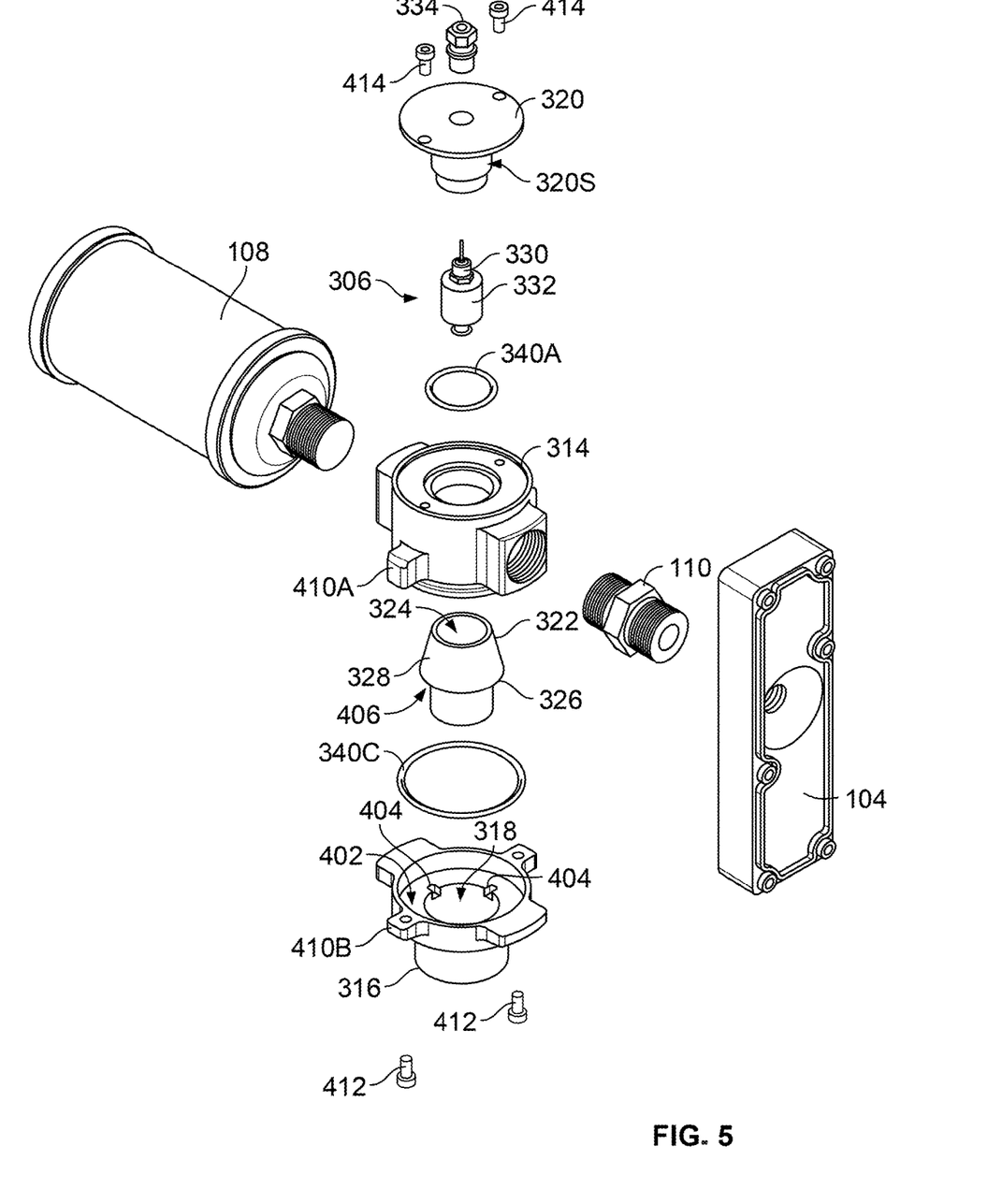
FIG. 5 depicts an exploded diagram of the leak detection device of FIG. 1.

FIGS. 3-5 depict various views of the leak detection device 106. FIG. 3 depicts a top cross-sectional view of the leak detection device 106 taken at axis A-A'. FIG. 4 depicts a side cross-sectional view of the leak detection device 106 taken at axis A-A'. And, FIG. 5 depicts an exploded diagram of the leak detection device 106.

Referring to FIGS. 3-5, leak detection device 106 includes a body 302, a liquid separator 304, and a liquid level detector 306. Leak detector body 302 has an airflow inlet 310 and an airflow outlet 312. Airflow inlet 310 and airflow outlet 312 are arranged on body 302 to be substantially aligned with each other on opposite sides of the body 302. For example, such an arrangement provides a substantially straight flow path from the air exhaust outlet 112 through the leak detection device 106 and into the inlet 114 of muffler 108. For example, the airflow path follows generally along axis A-A'.

Liquid separator 304 is positioned directly in the airflow path to, for example, obstruct the flow of any entrained equated within the exhaust air. In other words, liquid separator 304 is positioned within body 302 directly between the airflow inlet 310 and the airflow outlet 312. Liquid separator 304 provides a direct air impingement surface 320S within the airflow path between the pump's air exhaust and the inlet 114 to muffler 108. Liquid separator 304 causes heavy liquid particles that may be entrained in the exhaust air (e.g., from a diaphragm leak) to fall out of the air flow when they impact the impingement surface 320S, and diverts the exhaust air along flow paths between the liquid separator 304 and the inner surface of the body 302.

As illustrated in FIG. 3, liquid separator 304 has a generally circular cross-section along the airflow path (e.g., axis A-A'). However, in other implementations, liquid separator 304 can be formed with a different shaped cross-section. For example, liquid separator 304 can be formed with a teardrop shaped cross-section. In such implementations, liquid separator 304 can be oriented with the narrow portion of the teardrop shape directed towards the outlet 312 and the portion of the teardrop shape directed towards the inlet 310 to act as the air impingement surface.

A liquid reservoir 318 is formed in a lower portion of body 302. As entrained liquid is removed from exhaust air by impingement against liquid separator 304 it flows down along the side of liquid separator 304 and into the liquid reservoir 318 where the liquid collects. Liquid level detector 306 is at least partially contained within a channel 324 defined within a lower portion of liquid separator 304. The channel 324 is in fluid communication with the reservoir 318. As liquid collects in reservoir 318, the level of the liquid rises within channel 324. Liquid level detector 306 will be activated once the liquid collected in reservoir 318 reaches a level that triggers the liquid level detector 306. Once triggered, liquid level detector 306 provides an electrical output signal indicating a diaphragm leak in the pump.

Liquid level detector 306 can be implemented as, an electronic liquid level sensor, an optical liquid level sensor, or a float switch, for example. As illustrated, liquid level detector 306 is implemented as a float switch assembly with a float 332 operably coupled to a flow sensor 330. Liquid level detector 306 includes an electrical output connector 334 through which liquid level detector 306 provides electrical output signals. For example, liquid level detector 306 can be connected to a pump monitoring system, which, upon receipt of an activation signal from the level detector, can initiate a pump leak alarm. In some examples, electrical connector 334 can be a waterproof electrical connector.

In some implementations, leak detector body 302 includes an upper housing 314 and a lower housing 316. The leak detector inlet 310 and outlet 312 are formed in the upper housing 314. Lower housing 316 can form the liquid reservoir 318. Upper housing 314 and lower housing 316 can be separable to permit cleaning or maintenance of the leak detector. For example, upper housing 314 can include coupling posts 410A arrange to mate with a coupling flange 410B on lower housing 316. Lower housing 316 is fastened to upper housing 314 by mechanical fasteners 412. For example, coupling posts 410A can be threaded to receive threaded fasteners 412. An O-ring 340C can be disposed between upper housing 314 and lower housing 316 to provide a liquid tight seal.

In some implementations, liquid separator 304 includes an upper portion 320 and a sleeve 322. Upper portion 320 mates with an upper surface of the body's upper housing 314. Furthermore, upper portion 320 can include a cylinder that extends from the upper portion 320 into the airflow path through body 302. The cylinder forms the air impingement surface 320S. Level detector 306 can also be coupled within a channel through the upper portion 320 of liquid separator 304. For example, level detector 306 can be attached to the bottom of the liquid separator's upper portion 320 and extend into the channel 324 defined within air separator sleeve 322. The top end of sleeve 322 mates to the bottom end of upper portion 320. In some examples, an O-ring 340A is disposed between the upper portion 320 of air separator 304 and the upper surface of the body's upper housing 314. In some examples, an O-ring 340B is disposed between air separator sleeve 322 and air separator upper portion 320.

In some implementations, lower housing 316 is formed with a shelf 402 at an upper end of reservoir 318. The shelf 402 includes one or more drain channels 404. For example, shelf 402 can include two, three, four, five, or any appropriate number of drain channels 404. In addition, air separator sleeve 322 is formed with a tapered flange 326. The tapered flange 326 can be configured to extend at least partially over shelf 402. For example, tapered flange 326 can form a covering over reservoir 318 to isolate liquid contained in reservoir 318 from exhaust air flowing through the upper housing 314. In some examples, the tapered flange 326 is configured to rest on the shelf 402 of the lower housing 316. For example, the tapered flange 326 can be sized such that a bottom surface 406 of the flange rests on the shelf 402 of lower housing 316.

The drain channels 404 permit the liquid removed from the exhaust air by the liquid separator 304 to flow underneath tapered flange 326 and into the reservoir 318. This configuration may prevent liquid contained in the reservoir 318 from being re-entrained into exhaust air flowing through leak detection device 106. In some examples, the air separator sleeve 322 includes one or more vent holes 328 to, for example, allow air to exit the channel 324 as liquid drains into the reservoir 318.

In some implementations, lower housing 316 can be made of a transparent material to, for example, permit visual inspection of any liquid contained in reservoir 318. In some implementations, only the portion of lower housing 316 that forms reservoir 318 is made of a transparent material. In some of the limitations, lower housing 316 can include windows to permit viewing of any liquid contained in reservoir 318.

In operation, leak detection device 106 receives exhaust air from an air-operated diaphragm pump 101. Leak detection device 106 removes liquid entrained in the exhaust air by a direct impingement device (e.g., liquid separator 304) positioned to direct a flow of the exhaust air into at least two separate flow paths around the direct impingement device. Leak detection device 106 directs the exhaust air towards an air impingement surface 320S of the direct impingement device, where impingement of the exhaust air on the direct impingement device removes entrained liquid from the exhaust air. Liquid can also be removed from the exhaust air impinging on the internal surface of the body 302. Leak detection device 106 directs the liquid into a liquid reservoir 318 positioned below the direct impingement device. For example, tapered flange 322 directs the liquid through drain channels 404 in the body 302 and into reservoir 318. Leak detection device 106 provides a leak indication signal responsive to activation of liquid level detector 306 that is at least partially contained within channel 324 defined by a lower portion of the direct impingement device (e.g., sleeve 322).

As used herein, the terms "orthogonal" or "substantially orthogonal" refer to a relation between two elements (e.g., lines, axes, planes, surfaces, or components) that forms a ninety degrees (perpendicular) angle within acceptable engineering, machining, or measurement tolerances. For example, two surfaces can be considered orthogonal to each other if the angle between the surfaces is within an acceptable tolerance of ninety degrees (e.g., ±1-2 degrees).

As used herein, the terms "aligned," "substantially aligned," "parallel," "substantially parallel," "flush," or "substantially flush" refer to a relation between two elements (e.g., lines, axes, planes, surfaces, or components) as being oriented generally along the same direction within acceptable engineering, machining, drawing measurement, or part size tolerances such that the elements do not intersect or intersect at a minimal angle. For example, two surfaces can be considered aligned with each other if surfaces extend along the same general direction of a device. Similarly, two surfaces can be considered to be flush or substantially flush if both surfaces generally lie within the same plane, but may a slight offset that is within acceptable tolerances may still exist between the surfaces.

While a number of examples have been described for illustration purposes, the foregoing description is not intended to limit the scope of the invention, which is defined by the scope of the appended claims. There are and will be other examples and modifications within the scope of the following claims.

What is claimed is:

1. A diaphragm pump leak detection method comprising:
   obtaining a diaphragm pump leak detection device comprising:
     a body comprising:
       an airflow inlet;
       an airflow outlet arranged to align with the airflow inlet; and
       a liquid reservoir in a bottom portion of the body;
     a liquid separator positioned directly between the airflow inlet and the airflow outlet, the liquid separator dividing an airflow path from the airflow inlet to the airflow outlet into at least two separate flow paths around the liquid separator; and
     a liquid level detector at least partially contained within a channel, wherein the channel is in liquid communication with the liquid reservoir,
     wherein the airflow inlet, liquid separator, and airflow outlet together define the airflow path from the airflow inlet, around the liquid separator, and to the airflow outlet that does not pass through the liquid reservoir;
   receiving, by the diaphragm leak detection device, exhaust air from an air-operated diaphragm pump at the airflow inlet;
   removing liquid entrained in the exhaust air by using the liquid separator that is positioned directly between the airflow inlet and the airflow outlet in the airflow path to direct a flow of the exhaust air into the at least two separate flow paths around the liquid separator, wherein impingement of the exhaust air on the liquid separator removes the liquid from the exhaust air;
   directing the liquid into the liquid reservoir positioned below the liquid separator;
   after removing the liquid entrained in the exhaust air, directing the exhaust air to the airflow outlet that is aligned with the airflow inlet; and
   providing a leak indication signal responsive to activation of the liquid level detector that is at least partially contained within a channel defined by a lower portion of the liquid separator and the channel being in liquid communication with the liquid reservoir.

2. The method of claim 1, wherein the liquid separator comprises a cylinder positioned directly between the airflow inlet and the airflow outlet of a body of the leak detection device, wherein impingement of the exhaust air on the liquid separator removes the liquid from the exhaust air.

3. The method of claim 1, wherein the liquid level detector comprises a float switch assembly, wherein providing the leak indication signal responsive to activation of the float switch assembly comprises:
   collecting the liquid in the liquid reservoir; and
   sensing, by the float switch assembly, that the liquid in the liquid reservoir has reached a level that triggers the float switch assembly.

4. The method of claim 3, wherein providing the leak indication signal responsive to activation of the float switch assembly comprises, responsive to sensing, by the float switch assembly, that the liquid in the liquid reservoir has reached a level that triggers the float switch assembly, providing, by the float switch assembly, an electrical output signal indicating a diaphragm leak in the air-operated diaphragm pump.

5. The method of claim 3, wherein the float switch assembly comprises a float operably coupled with a float sensor, wherein the float is housed within the channel defined within the lower portion of the liquid separator, sensing, by the float switch assembly, that the liquid in the liquid reservoir has reached a level that the float triggers the float sensor.

6. The method of claim 5, wherein the float sensor extends, at least partially, into the channel defined within the lower portion of the liquid separator.

7. The method of claim 2, wherein the liquid separator further comprises a sleeve configured to interface with the lower portion of the cylinder, the sleeve comprising the channel, wherein a first end of the channel terminates at the lower portion of the cylinder and a second end of the channel opens to the liquid reservoir, the method further comprises preventing, by the sleeve, liquid contained in the liquid reservoir from being re-entrained into exhaust air flowing through the liquid separator.

8. The method of claim 2, wherein the liquid level detector is coupled to the lower portion of the cylinder and extends into the channel.

9. The method of claim 7, wherein the body comprises a shelf comprising at least one drain channel that provides liquid communication between the liquid reservoir and an airflow path in an upper portion of the body, the shelf positioned above the liquid reservoir and the sleeve comprises a tapered flange in contact with the shelf, removing liquid entrained in the exhaust air further comprises:
  separating, by the tapered flange, the liquid in the liquid reservoir from the airflow path in the upper portion of the body; and
  draining the liquid from the airflow path through the drain channel into the liquid reservoir.

10. The method of claim 9, wherein the body comprises:
  an upper housing comprising:
    the airflow inlet,
    the airflow outlet, and
    the airflow path between the airflow inlet and the airflow outlet; and
  a lower housing, separable from the upper housing, that comprises:
    the liquid reservoir,
    the shelf, and
    the at least one drain channel.

11. The method of claim 2, further comprising muffling the exhaust air.

12. A diaphragm pump leak detection device comprising:
  a body comprising:
    an airflow inlet;
    an airflow outlet arranged to align with the airflow inlet; and
    a liquid reservoir in a bottom portion of the body;
  a liquid separator positioned directly between the airflow inlet and the airflow outlet; the liquid separator dividing an airflow path from the airflow inlet to the airflow outlet into at least two separate flow paths around the liquid separator; and
  a liquid level detector at least partially contained within a channel, wherein the channel is in liquid communication with the liquid reservoir;
  wherein the airflow inlet; liquid separator; and airflow outlet together define the airflow path from the airflow inlet, around the liquid separator, and to the airflow outlet that does not pass through the liquid reservoir.

13. The diaphragm pump leak detection device of claim 12, wherein a cross-section of the liquid separator is circular.

14. The diaphragm pump leak detection device of claim 12, wherein a cross-section of the liquid separator is teardrop shaped.

15. The diaphragm pump leak detection device of claim 14, wherein a narrow portion of the teardrop shaped cross-section is oriented towards the airflow outlet and a wide portion of the teardrop shaped cross-section is oriented toward the airflow inlet.

* * * * *